Aug. 25, 1970  E. VAN SICKLE ET AL  3,525,421

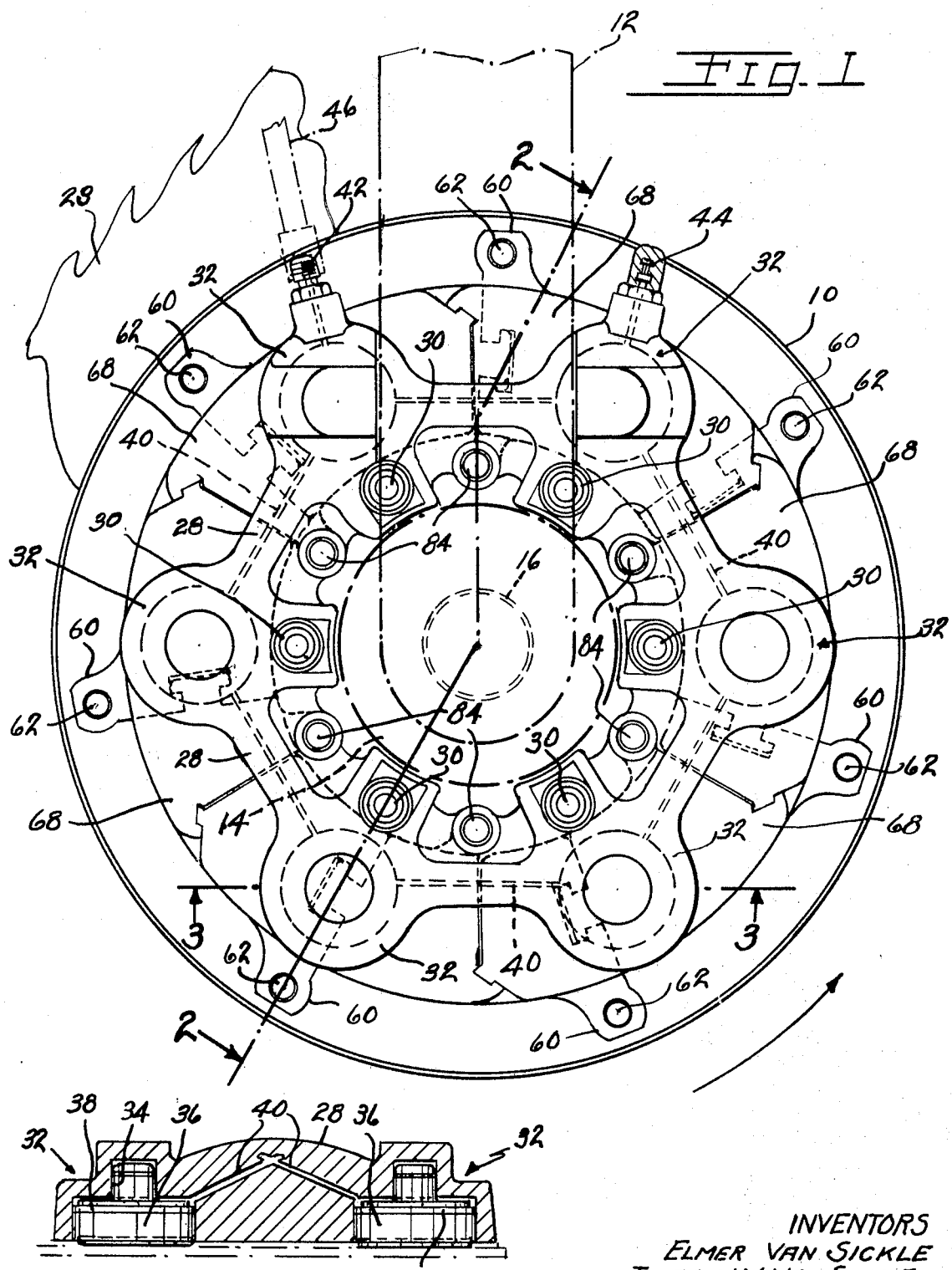

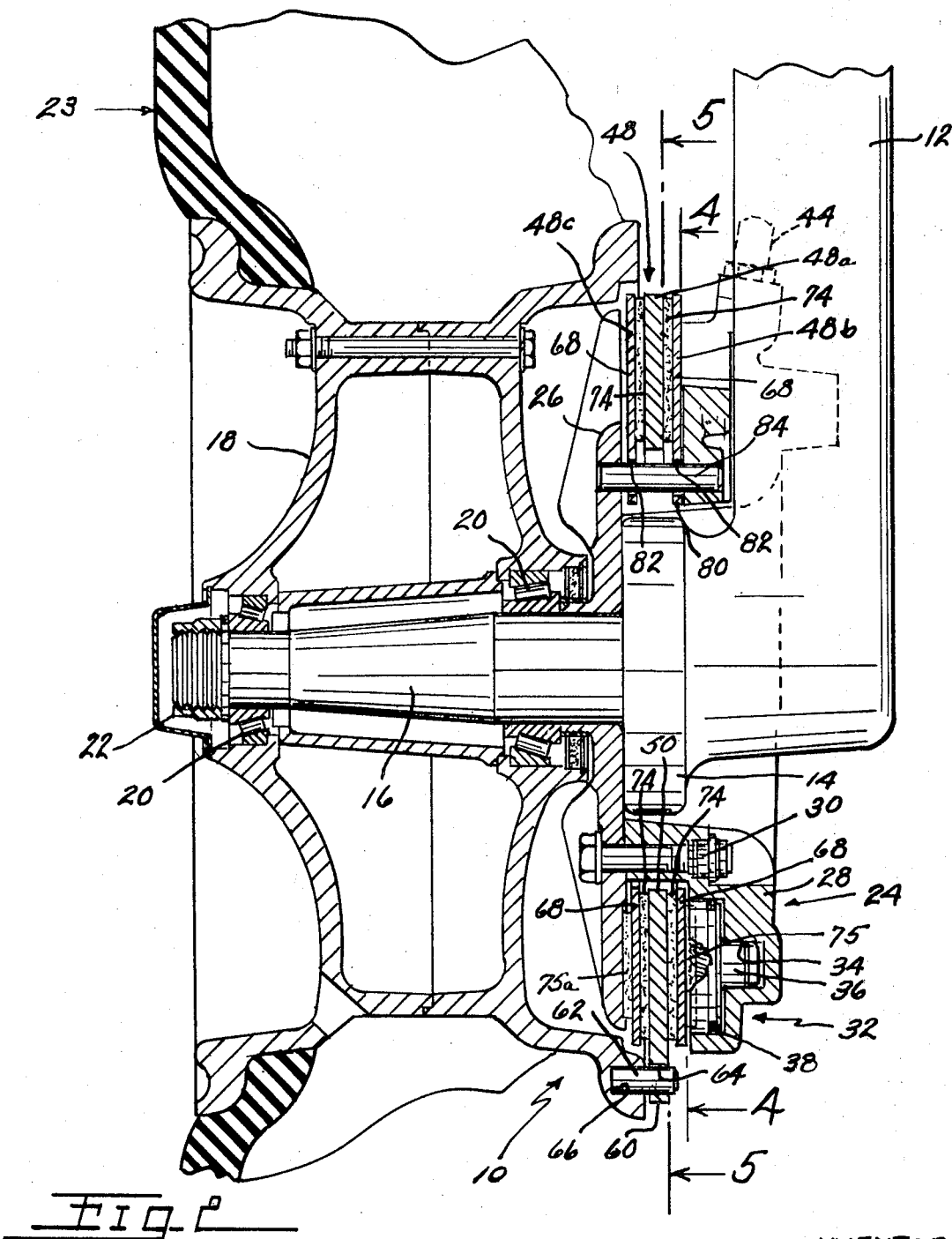

SEGMENTED DISC BRAKE

Filed July 17, 1968  8 Sheets-Sheet 4

INVENTORS
ELMER VAN SICKLE
JOSEPH W. VAN SICKLE
EDWARD J. KRUKE
BY Baldwin, Egan, Walling & Fetzer
ATTORNEYS

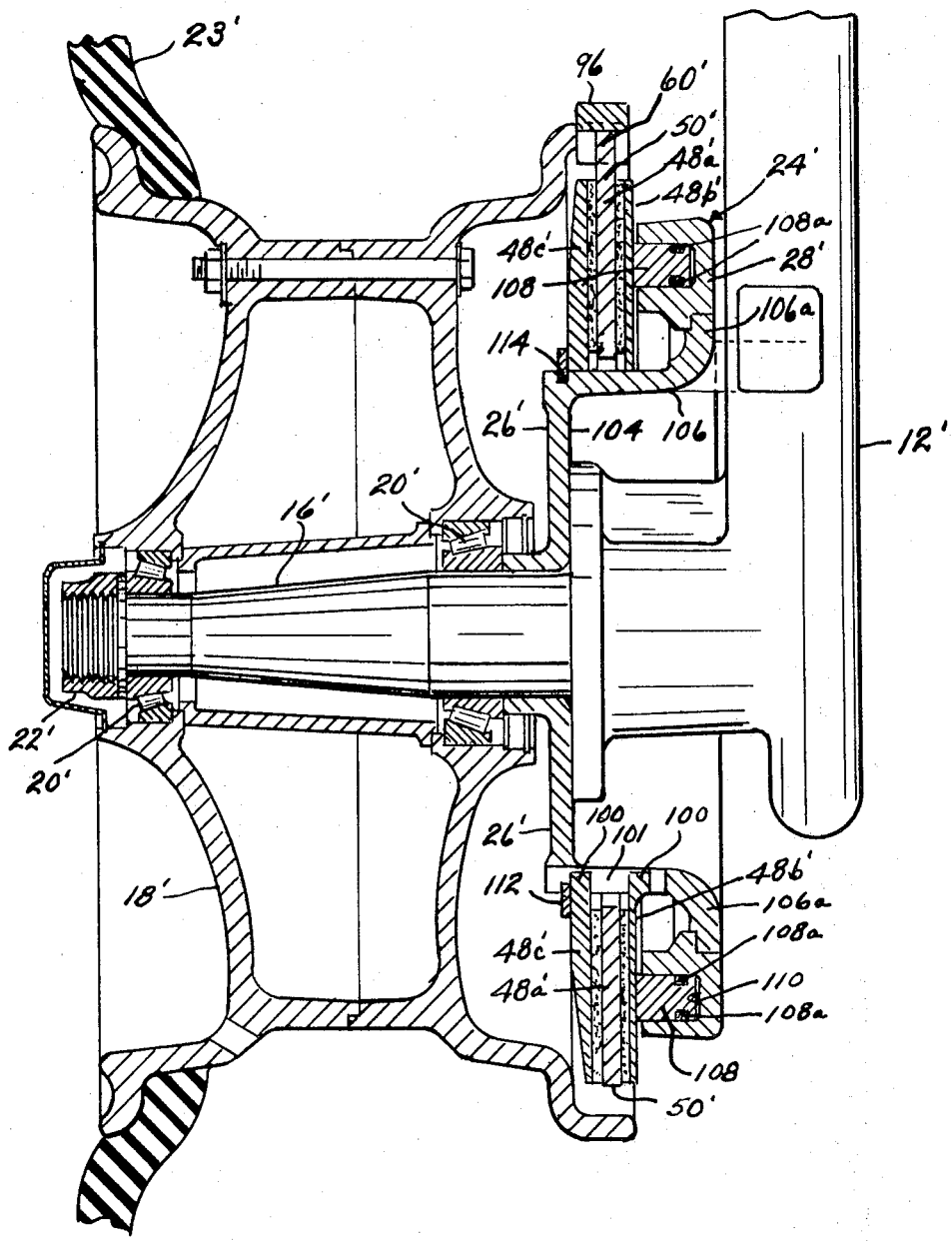

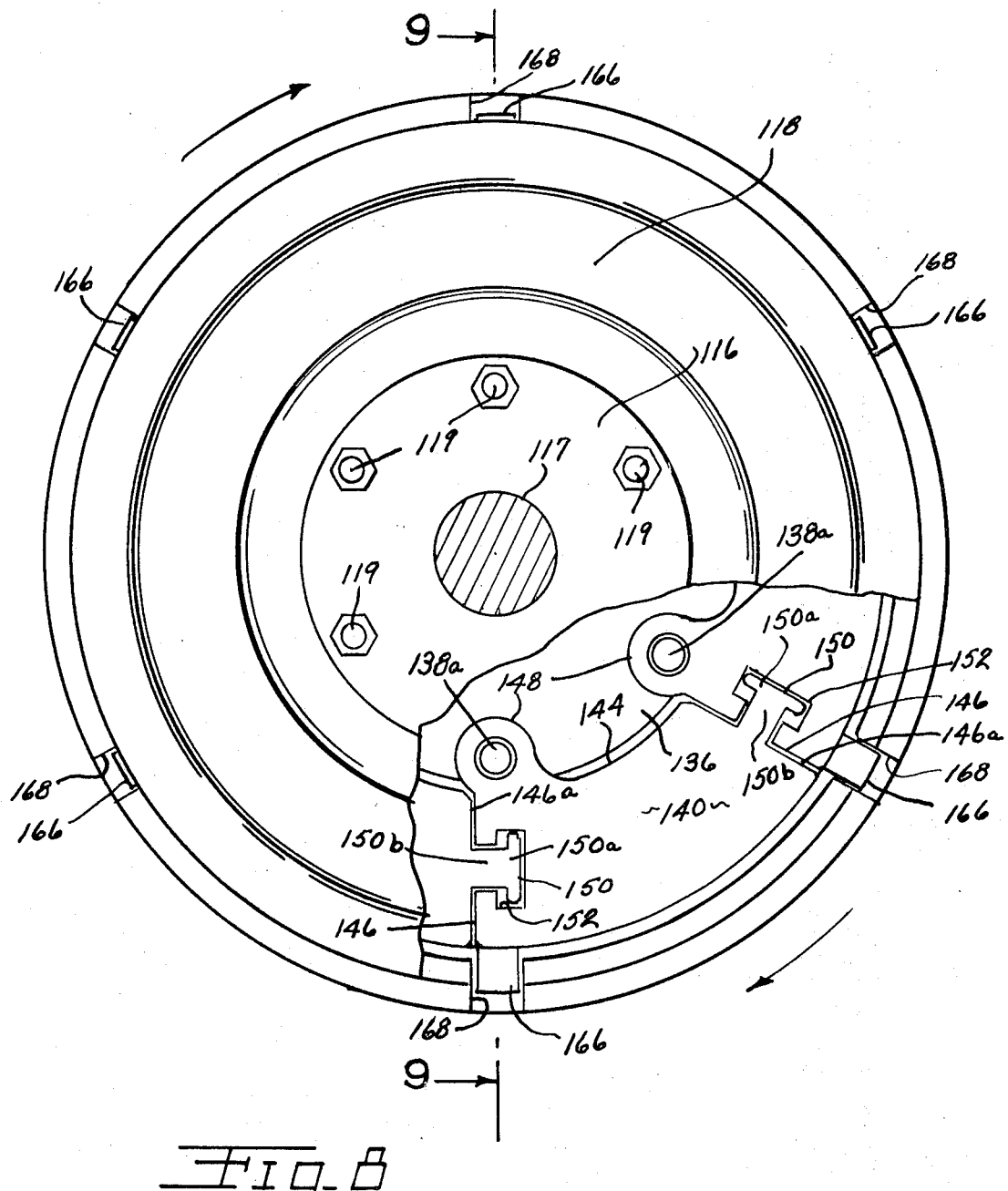

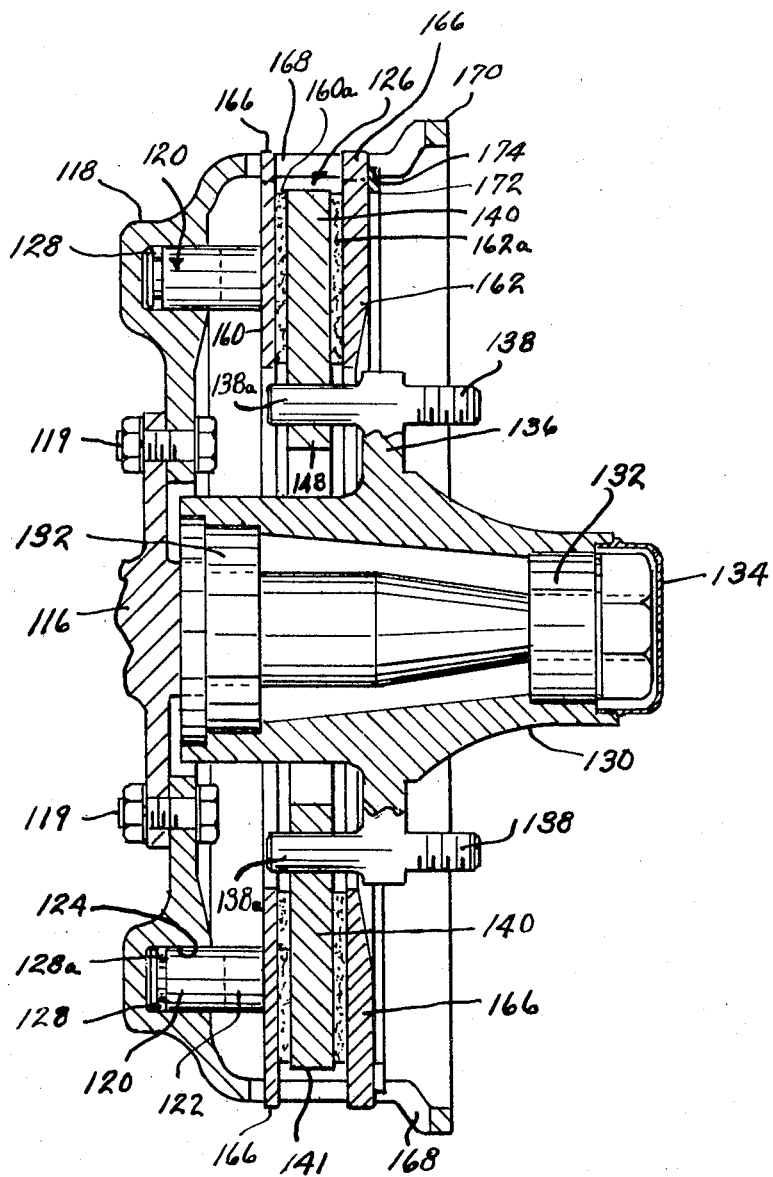

United States Patent Office 3,525,421
Patented Aug. 25, 1970

3,525,421
SEGMENTED DISC BRAKE
Elmer Van Sickle, Rocky River, Joseph W. Van Sickle, Berea, and Edward J. Kruke, Avon Lake, Ohio, assignors to The Cleveland Aircraft Products Co., Avon, Ohio, a corporation of Ohio
Filed July 17, 1968, Ser. No. 745,599
Int. Cl. F16d 55/32, 65/12
U.S. Cl. 188—71.5                            13 Claims

ABSTRACT OF THE DISCLOSURE

A segmented disc brake which includes interleaved braking discs adapted for frictional coaction with one another by means of fluid pressure actuating means, and wherein at least one of the braking discs is of a segmented construction. Each of the plate-like segments is of polygonal configuration in side elevation and embodies a coupling portion thereon disposed at one corner of the segment and adapted for securing or mounting the segment to a supporting portion of the braking mechanism for effectively absorbing the torque forces applied to the brake discs during operation of the mechanism. In certain embodiments, the disc segments, in addition to having the aforementioned coupling portion for mounting the segment on the said supporting portion, also include means for coupling each segment to the adjacent segment, thus facilitating the assembly of the braking discs in the braking mechanism and limiting the relative movement between adjacent segments during braking operations.

---

This invention relates in general to segmented disc brakes and more particularly to an improved arrangement of brake segment for mounting the segments on a support, and for coupling the segments to one another in a ring-like configuration.

Segmented disc brake mechanisms are known in the art, and also known in the art is the provision of a segment with a projection thereon received in a recess in an adjacent segment for holding the segments in annular form. However during use of such prior art braking mechanism, forces are applied to the segments and due to the manner of mounting the segments on the support, the mounting means and/or the coupling means fastening the segments together sometimes fails. An example of such prior art mechanism is that disclosed in U.S. Pat. 3,105,575 issued Oct. 1, 1963 to D. Dewar et al., and entitled Improvements in Brake Discs.

The present invention provides a segmented disc-type brake assembly wherein the forces applied to the segments during the braking operation are transferred to coupling means disposed adjacent the ends of the segments and coupling each segment to its respective supporting member of the brake assembly, thus providing a stronger arrangement and a longer life for the braking segments, while still maintaining the dissipation of heat generated during braking operations.

Accordingly, an object of the present invention is to provide an improved segmented disc-type brake arrangement.

Another object of the invention is to provide a segmented disc-type brake wherein at least one braking disc is comprised of a plurality of segments disposed in end-to-end relation forming a ring-like configuration, and wherein each of said segments embodies a coupling means thereon attaching each segment to a supporting portion of the brake, and wherein said coupling means is disposed adjacent the juncture of a radial end edge and an arcuate side edge of the respective segment.

A further object of the invention is to provide a disc brake of the aforediscussed type wherein each of said segments includes headed projection means thereon for coupling the segment to the next adjacent segment.

A further object of the invention is to provide a disc brake of the abovediscussed type wherein said coupling means comprises an apertured boss disposed in the plane of the respective segment and projecting outwardly from said juncture.

A still further object of the invention is to provide a segmented disc-type brake assembly comprising a rotatable member and a stationary member and having a friction rotor assembly coupled to said rotatable member and a friction stator assembly coupled to the stationary member, with each of the assemblies comprising a plurality of separate segments disposed in ring-like orientation, with each segment having means thereon for movably attaching the segment to its respective member and also embodying means thereon for coupling each segment to its adjacent segment, thereby providing for free expansion of the segments under the influence of heat or stress, but preventing excessive displacement of the segments with respect to one another.

Other objects and advantages of the invention will be apparent from the following description taken in conjunction with the accompanying drawings wherein:

FIG. 1 is a side elevation of a segmented disc brake, constructed in accordance with the present invention;

FIG. 2 is a sectional view taken generally along the plane of line 2—2 of FIG. 1 looking in the direction of the arrows;

FIG. 3 is a fragmentary sectional view taken generally along the plane of line 3—3 of FIG. 1 looking in the direction of the arrows;

FIG. 7 is a sectional view taken generally along the plane of line 7—7 of FIG. 6 looking in the direction of the arrows;

FIG. 8 is a partially broken side elevational view of a further modification of the invention; and FIG. 9 is a sectional view taken generally along the plane of line 9—9 of FIG. 8 looking in the direction of the arrows.

Figure 4:
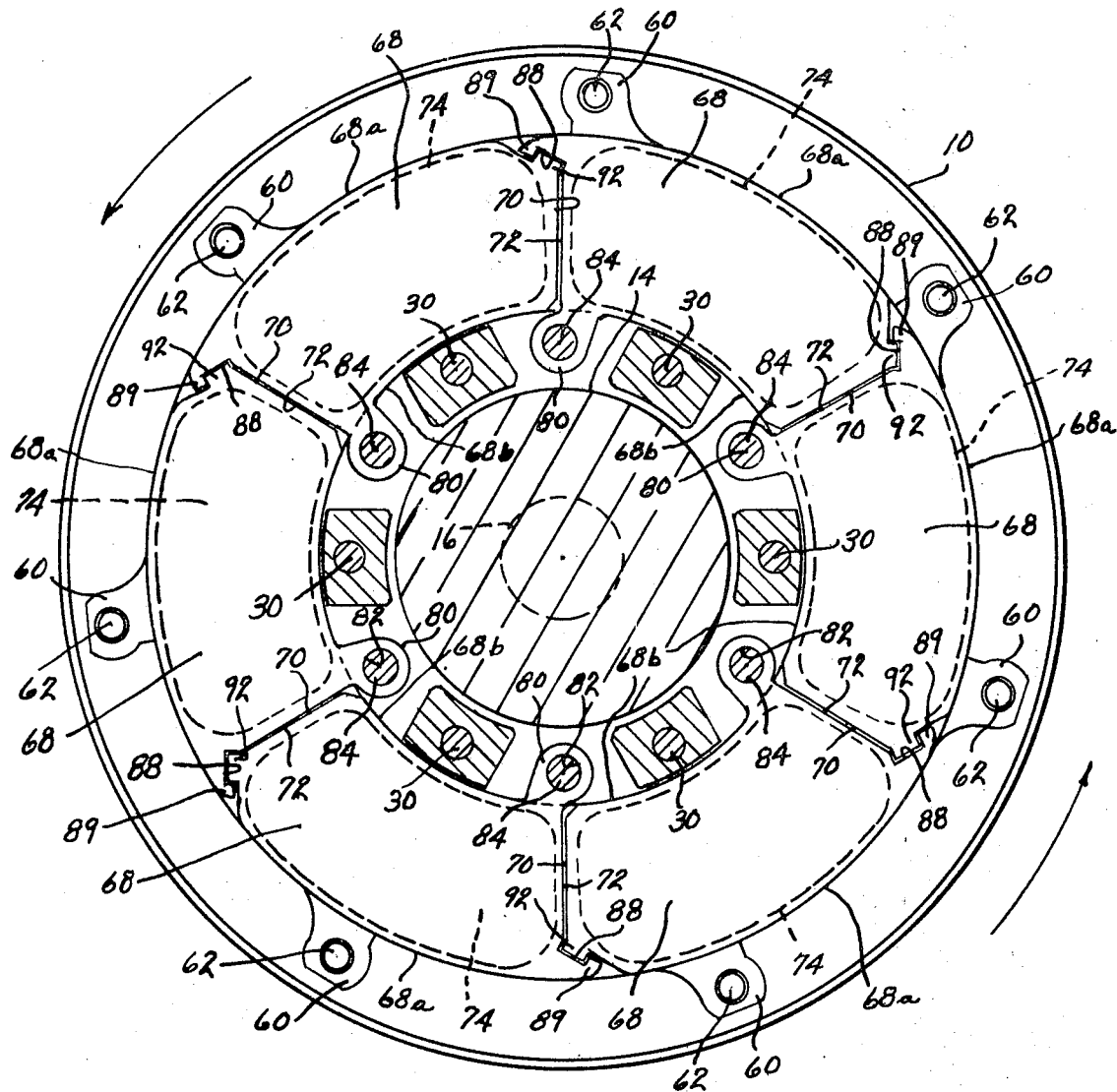
FIG. 4 is a sectional view taken generally along the plane of line 4—4 of FIG. 2 looking in the direction of the arrows, and particularly illustrating the segmented stator disc.
Figure 5:
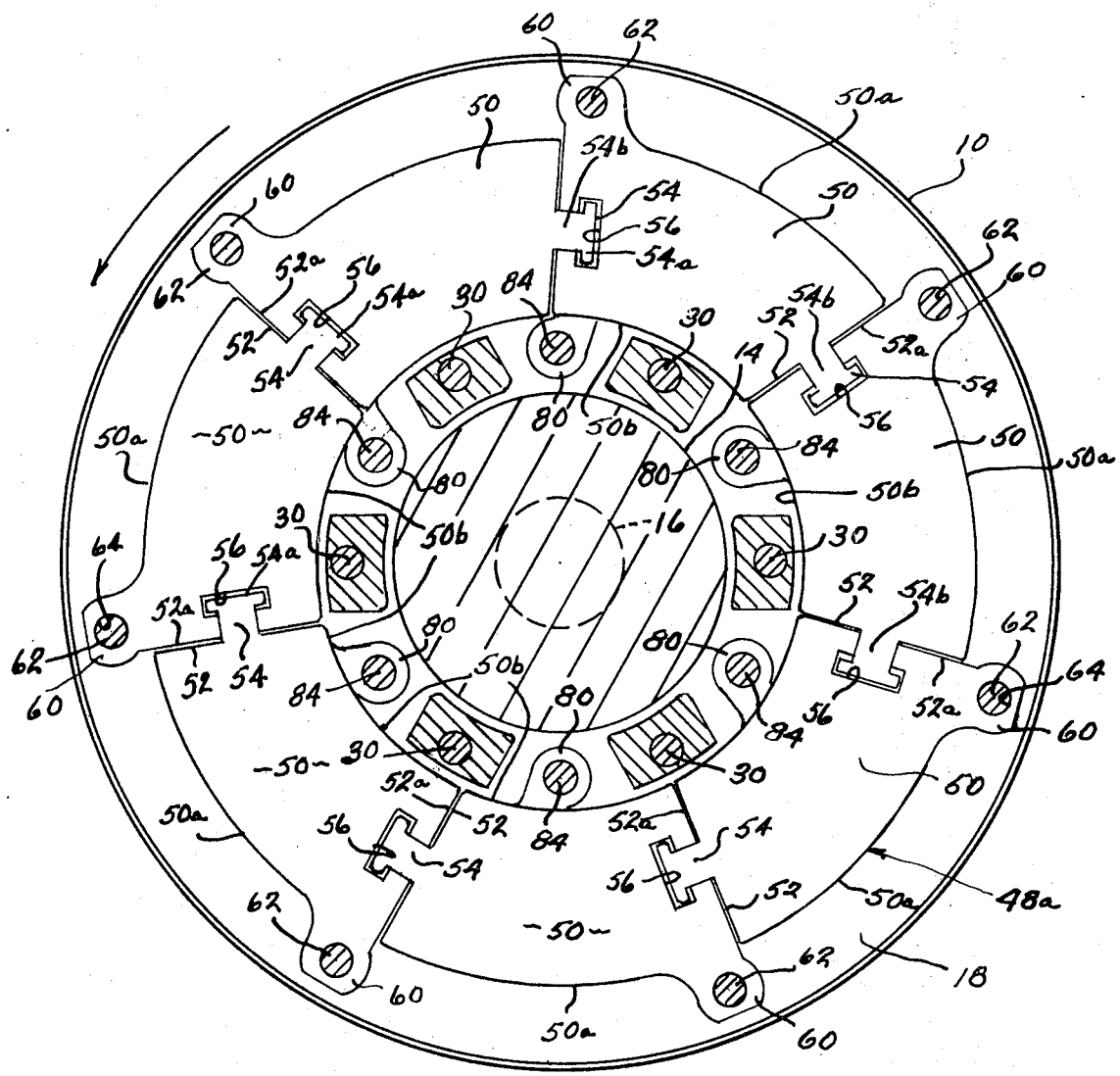
FIG. 5 is a sectional view taken generally along the plane of line 5—5 of FIG. 2 looking in the direction of the arrows and particularly illustrating the segmented rotor disc.

Referring now again to the drawings, and in particular to FIGS. 1 through 5, there is illustrated a disc brake 10, which for illustrative purposes is shown mounted on an airplane landing gear strut 12, said strut including a hub portion 14 and a laterally projecting stationary axle 16. A wheel rim 18 is rotatably mounted on axle 16 as by means of bearings 20, and suitable means 22 is provided for removably securing the wheel rim in rotatable rotation on the axle 16. Rim 18 may support a tire 23.

Centered on the axle 16 in generally stationary relation with respect to the axle and strut 16 and 12 is a plate assembly 24 comprising an inner or backup plate 26, and an outer or power plate 28. Inner and outer plates 26, 28 may be secured to one another by means of fasteners 30.

Spaced equidistant about the outer plate 28 for effecting initial actuation of the brake is a plurality of fluid pressure operated actuator devices 32. Each actuator device comprises a piston chamber 34 (FIG. 2) having reciprocally mounted therein an actuator piston 36. Each piston has a sealing means, such as an O-ring seal 38, coacting therewith and with the periphery of the piston chamber 34. Chambers 34 communicate with one another by means of passages 40 (FIGS. 1 and 3) formed in the outer power plate 28. A fluid inlet 42 (FIG. 1) is provided for admitting pressurized fluid to the piston cylinders, and a bleed port 44 may be provided for bleeding the braking system. Inlet 42 is adapted for coupling as by means of flexible conduit 46 to a source of pressurized fluid (not shown).

Disposed between the inner and outer plates 26, 28 of plate assembly 24 are means 48 (FIG. 2) for selectively establishing or interrupting the transmission of torque from the wheel 18 to the plate assembly 24, said means 48 comprising a segmented rotor disc 48a and segmented stator discs 48b and 48c.

Rotor disc 48a comprises a plurality of polygonal shaped segments 50 (FIG. 5) arranged in a ring-like configuration and each comprising an outer arcuate side edge 50a and an inner arcuate side edge 50b. Radial end edges 52, 52a connect the arcuate inner and outer side edges to define the periphery of the plate-like segment.

Edge 52 of each segment has a projection 54 projecting outwardly therefrom in the plane of the segment, with such projection comprising a widened head portion 54a and a narrower neck portion 54b, to provide a generally T-shaped configuration of projection. The edge 52a of each segment may be provided with a recess 56 opening onto edge 52A and formed complementary to the projection 54 on the adjacent segment. It will be seen, therefore, that with the projection on each segment received in the complementary recess 56 on the adjacent segment, the segments are maintained in generally assembled condition for facilitating the assembly of the rotor disc in the brake assembly, while providing for some relative movement between the segments, thus maintaining good heat dissipation and yet preventing excessive displacement of the segments with respect to one another.

Each segment 50 is also provided with an embossment 60 formed integrally therewith. Embossment 60 is disposed in the plane of the segment and projects generally radially outwardly of the segment 50 at the juncture of the end edge 52a and the outer side edge 50a of the segment. A pin 62 (FIG. 2) extends through an aperture 64 in the boss 60, and is received in preferably tight relation in a recess 66 (FIG. 2) disposed adjacent the outer periphery of rim 18 of the wheel, thus securing the segment 50 to the rotatable rim. Segments 50 of the rotor disc may be formed of any suitable material such as, for instance, SAE 4130 annealed steel.

Referring now to FIG. 4, the stator discs 48b, 48c may likewise be formed of segments 68. Since stator friction discs 48b, 48c are identical, only one will be described in detail. Each stator segment 68 comprises generally arcuate outer and inner side edges 68a and 68b and generally radially extending end edges 70 and 72 extending between the side edges 68a and 68b. The side face of each segment 68 which is disposed in confronting relation to the rotor segments 50, may be recessed and a pad of friction material 74 (FIG. 2) may be bonded to the respective segment in such recess, for creating high friction characteristics between the stator and rotor discs. Likewise the piston 36 of each of the fluid pressure actuators 32, and the inner backup plate 26 of the plate assembly 24, may be provided with spaced pads 75, 75a of the friction-creating material, adapted for engagement with respectively the segments 68 of outer stator disc assembly 48b and the segments 68 of the stator disc assembly 48c. It will be noted in this connection that the pressure actuators 32 are located generally centrally of the respective segment 68 of stator friction disc assembly 48b, and as can be best seen from FIG. 1 of the drawings.

Each segment 68 of stator disc assemblies 48b, 48c is provided at the juncture of end edge 72 and inner side edge 68b with a boss 80 which is disposed in the plane of the respective segment and which has an opening 82 therethrough receiving a pin 84 which is secured to the inner and outer plates 26, 28 of the plate assembly 24, thus anchoring the stator segments to the plate assembly.

Each end edge 72 of each segment 68 may also be provided with a recess 88 therein, with said recess being defined in part by a hook-shaped portion 89 and in which recess is received a dog 92 formed on the adjacent segment at the juncture of end edge 70 and outer side edge 68a. It will be seen that dog 92 and coacting recess 88 couple the adjacent segments together, and limit their radial and circumferential movement with respect to one another and with respect to the rotor segments 50. It will be seen that as the wheel rotates, the rotor segments 50, due to centrifugal force, are pivoted about their axes 62 and the coaction between the projections 54 and the associated recess 56 in the adjacent segment prevents excessive pivotal movement of the rotor segments. During application of the braking force due to the fluid-powered actuators 32, the torque due to rotating wheel 18 is applied to the stator segments 68, and such segments tend to pivot about their pivot points 84, but such pivoting is limited by the coaction between the dog 92 on each segment and its coacting recess 88 in the adjacent segment. It will also be noted that in both the rotor and the stator segments the forces applied thereto, such as the centrifugal force due to the rotation of the wheel and the torque force due to the application of the brakes, is applied to the respective means anchoring the segments to its respective support (i.e. the rim, in the case of the rotor segment and the respective inner or outer plate of the plate assembly 24 in the case of the stator segments) and at a location whereby the torque forces applied to the stator and rotor segments are absorbed in compression by the respective coupling portion located at or adjacent an end corner of the respective segment.

Figure 6:
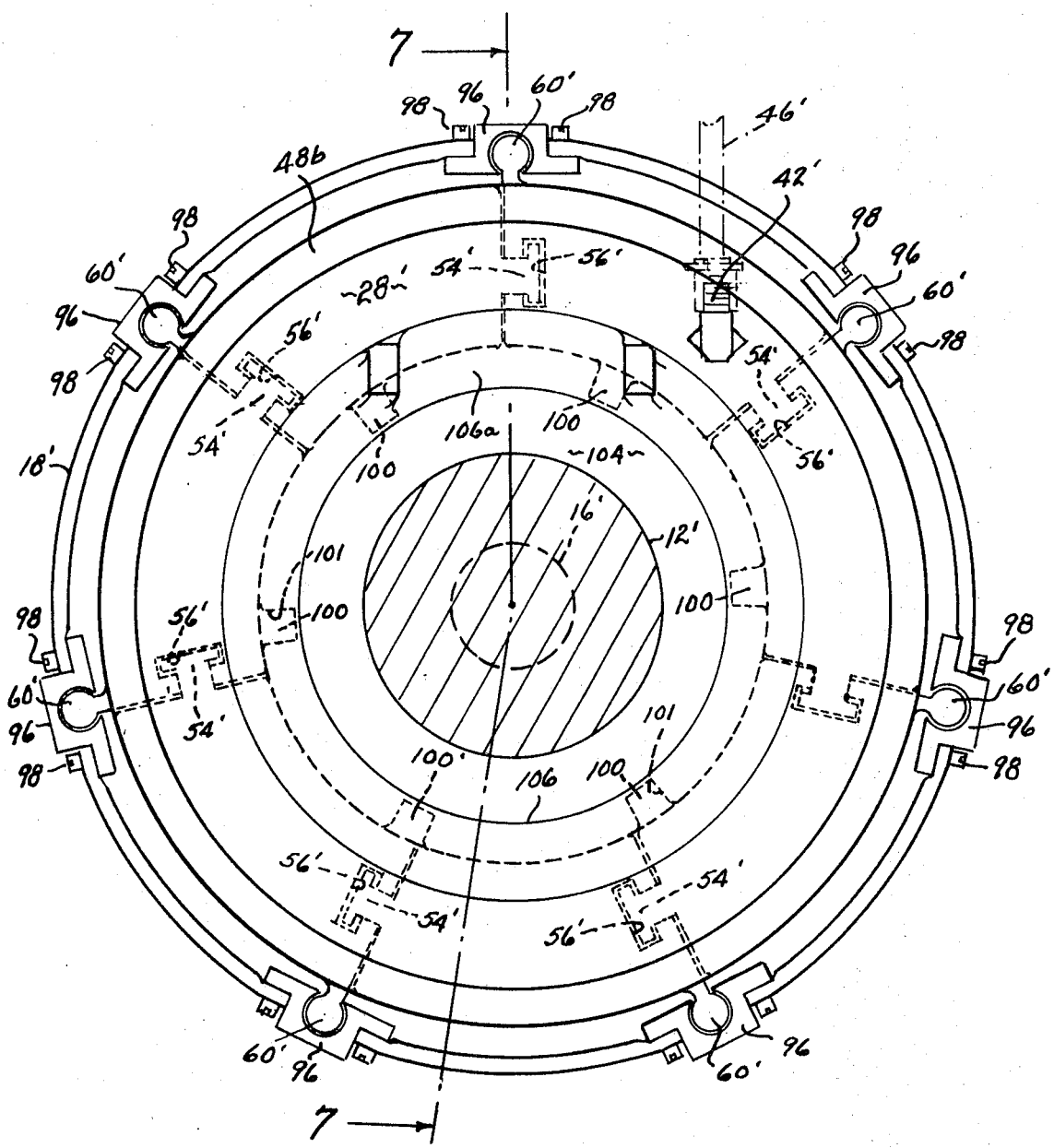
FIG. 6 is a side elevational view of a modified form of segmented disc brake.

Referring now to FIGS. 6 and 7, there is illustrated a modified form of the invention. In this embodiment a different arrangement is provided for coupling the rotor segments to their respective support. Instead of using pins and embossments for coupling the rotor segments, as in the first described embodiment, in this modified form the rotor segments 50' have an embossment 60' of generally circular configuration, disposed in the plane of the segment, and formed at the outer corner thereof, but such embossments 60' are not apertured and are received in a detachable socket member 96, which is attached as by means of fasteners 98 (FIG. 6) to the rim 18' of the wheel, thus coupling the segments to the rim in the plane of rotation of the latter. The rotor segments 50' are coupled together by projections 54' and coacting recesses 56' in a similar manner as for the first-described embodiment. The stator discs 48b', 48c' instead of being segments may be of solid ring-like construction with each comprising spaced generally radially extending projecting lugs 100 on the inner side edge 68b', disposed in the plane of the respective disc, and received in respective transverse slots 101 in backup member 26'.

In this embodiment the inner or backup member 26' of the plate assembly 24' comprises a generally vertically-arranged end wall 104 and a circular hub portion 106 (FIG. 7) having an outwardly divergent end 106a which coacts in interlocking relation with the circular power plate member 28' and supports the latter, so that the fluid pressure-operated actuator 32' is disposed in operative position. The fluid pressure actuator 32' instead of comprising circumferentially spaced individual actuators as in the first described embodiment, may be one integral actuator, comprising a circular or ring-like piston element 108 (FIG. 7) having inner and outer sealing means 108a coacting with a circular chamber 110 disposed in the pressure plate 28'. An inlet 42' (FIG. 6) is provided whereby upon admission of pressurized fluid such as hydraulic oil as supplied by conduit 46', the actuator applies braking pressure to the outer friction stator disc 48b' and thus applies the brakes to the wheel. A split ring 112 coacting in a circumferential slot 114 disposed on the exterior of the hub portion 106 of the inner support 26', maintains the rotor and stator discs 48a', 48b' and 48c' in assembled relation.

While in this embodiment, each of the stator discs as illustrated comprises a unitary ring, such stator discs could be formed of segmented construction with each segment having one of the lugs 100 associated therewith. Some such coupling means, such as referred to by reference numerals 88, 92 in the first described embodiment, could also be provided in a segmented stator disc arrangement.

Referring now to FIGS. 8 and 9, there is shown a segmented disc brake mechanism for use in an automotive type of vehicle. The assembly may comprise a stationary support 116 including a stub axle 117 projecting laterally therefrom. A power plate 118 may be secured as by means of fasteners 119 to the support 116 and a fluid pressure actuator 120 including a ring-shaped piston 122 disposed in circular piston recess 124, may be provided for applying braking force to the interleaved braking disc assembly 126. Piston portion 122 may include sealing means such as outer and inner O-rings 128, 128a, for sealing the piston with respect to the defining periphery of the piston recess 124. An inlet (not shown) may be provided for furnishing pressurized fluid, such as hydraulic oil, from a source (not shown) to the recess 124 for actuating the piston portion 122.

A hub member 130 may be rotatably mounted on the stub shaft 117 as by means of roller bearings 132, and suitable means 134 may be provided for maintaining the hub on the shaft 117. Hub 130 may include a circular flange 136 to which are secured lug bolts 138 in circumferentially oriented relation about the flange 136. Lug bolts 138 include inwardly extending pin portions 138a which are adapted to mount a respective rotor segment 140 of the rotor friction disc 141.

Each rotor segment 140 comprises an arcuate outer side edge 142 and an arcuate inner side edge 144 (FIG. 8), and generally radially-extending end edges 146, 146a. A coupling portion such as an apertured boss 148, projects inwardly from the segment 140 in the plane of the latter, and with such boss being disposed generally at the juncture of the inner arcuate edge 144 and the end edge 146 of the respective segment. End edge 146a has a projection 150 extending outwardly therefrom in the plane of the respective segments, with the projection being in the embodiment illustrated of T-shaped configuration, including a widened head portion 150a and a narrowed neck portion 150b. Projection 150 is adapted to be received in a generally complementary formed recess 152 in the adjacent segment, and which opens onto the end edge 146, and which recess 152 is disposed generally centrally between the inner arcuate edge 144 and the outer arcuate edge 142.

It will be seen therefore, that the segments 140 are coupled to the rotary hub 130 by means of the respective pin portion 138a coacting with the respective boss 148, and likewise are coupled to one another by the coaction between the projection 150 and the slot 152 in the adjacent segment, thus facilitating the initial assembly of the rotor friction disc in the brake, and providing a coupling arrangement of the rotor segments to the hub whereby the centrifugal and torque forces applied to the segments during application of the brake are absorbed by the coupling boss disposed at one end of each of the segments.

In this embodiment, the inner and outer stator discs 160, 162 of the brake assembly may each be of solid ring-like configuration and may include a circular pad 160a, 162a, of friction generating material secured thereto, adapted for braking engagement with the rotor segments 140 of the rotor disc 141. Each stator disc 160, 162 may include a plurality of generally radially extending lugs 166 thereon, spaced circumferentially around the exterior of the respective disc, and adapted for being received in respective transverse slots 168 formed in the power plate 118. In this connection, it will be noted that the plate has an outwardly extending lip portion 170 which enables assembly of the stator disc lugs 166 into the slots 168 and split ring 172 coacting in a circumferential groove 174 formed in the inner periphery of the power plate 118 holds the disc assembly 126 in position.

It will be understood that while the stator friction discs 160, 162 are illustrated as being continuous circular discs, they also could be segmented in the general manner suggested in connection with the stator discs of the FIGS. 6 and 7 embodiment.

From the foregoing discussion and accompanying drawings, it will be seen that the invention provides a segmented disc brake mechanism embodying coupling means for coupling the disc segments to the supporting portion of the braking mechanism, and wherein the coupling portion of the segment is disposed at a corner of the segment, so that the forces applied thereto during the braking operation are absorbed by the segments and the coupling portions thereof in an expeditious manner, resulting in an improved disc brake mechanism.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

We claim:

1. In a segmented disc type brake comprising a stationary member and a rotatable member mounted on said stationary member, a friction rotor assembly coupled to said rotatable member and a friction stator assembly coupled to said stationary member, at least one of said assemblies comprising a plurality of separate segments disposed in substantially ring-like orientation, projection and recess coupling means coacting between adjacent segments of said one assembly for preventing excessive relative displacement therebetween each segment comprising substantially radial end edges and generally arcuate inner and outer side edges, and means coacting between each segment and the respective member movably attaching the segment to its respective member, the last mentioned means being disposed at one end of the respective segment for transmittal of forces from said segment to the respective member through said one end of each respective segment, said last mentioned means comprising a lug disposed in the plane of the respective segment, said lug commencing at one of said end edges and extending laterally of the corresponding side edge in a substantially circular configuration and then smoothly merging with the corresponding side edge, means coacting with each lug spaced radially outwardly from and in radial alignment with the coupling means coacting between each segment at said one end edge and pivotally mounting each of the segments to its respective member, and power means for shifting the assemblies into frictional coaction.

2. A brake in accordance with claim 1 wherein the respective of said members has a plurality of co-planar substantially circular recesses formed therein, each lug of each segment being received in relative pivotal relation in the respective of said recesses.

3. A brake in accordance with claim 1 wherein said coupling means comprises a headed projection extending from a radial end edge of each segment in the plane of the latter and a complementary recess in the adjacent segment extending inwardly from the confronting end edge thereof and receiving said projection therein.

4. A brake in accordance with claim 1 wherein said coupling means comprises a hook-shaped section on one segment coacting with a projecting dog on the adjacent segment, both said hook-shaped section and said dog being disposed in the plane of the respective segment, said hook-shaped section extending outwardly of said one end edge and said dog being located on the other end edge of the respective segment.

5. A brake in accordance with claim 1 wherein each of said lugs comprises an apertured boss, and said pivotal mounting means comprising a pin coacting between the boss and the respective member and pivotally coupling the segment to the member.

6. A brake in accordance with claim 5 wherein said boss is disposed at the juncture of the leading one of said end edges and said inner side edge.

7. A brake in accordance with claim 5 wherein said boss is disposed at the juncture of said outer side edge and the leading one of said end edges.

8. A brake in accordance with claim 1 wherein said stator assembly is comprised of said separate segments, said power means including a plurality of circumferentially disposed fluid actuated piston means adapted for engagement with a respective segment of said stator assembly for urging the stator assembly segments as a unit into engaged coaction with the confronting rotor assembly, each of said piston means being disposed in generally centrally oriented relationship to a respective confronting stator assembly segment.

9. A brake in accordance with claim 8 wherein said piston means are disposed in a unitary support member coupled to said stationary member.

10. A brake in accordance with claim 1 wherein at least said rotor assembly comprises a plurality of separate generally flattened segments disposed in generally ring-like orientation, and wherein said coupling means comprises a projecting portion extending outwardly from the other end edge of each respective segment and adapted to be received in a recess portion in said one end edge of the adjacent segment for limiting relative displacement between the segments during relative pivotal movement of the latter with respect to said rotatable member, said corresponding side edge with which said lug smoothly merges being substantially convex and uninterrupted except for said lug.

11. A brake in accordance with claim 10 wherein said stationary member comprises an axle, said rotatable member being rotatable on said axle, a back up member and a power member mounted on said stationary member, said rotor and stator assemblies being disposed between said back up and said power members, means detachably mounting said back up member on said stationary member, said power means comprising fluid actuated piston means mounted on said power member and adapted for engagement with said stator assembly to shift the latter axially into frictional engagement with said rotor assembly, said pivotal mounting means extending axially parallel to said axle and being mounted to the respective of the first mentioned members, said lug of each segment being slidably mounted in an axial direction on the respective of said pivotal mounting means whereby axial assembly and disassembly of the segments from the respective pivotal mounting means can be accomplished.

12. A brake in accordance with claim 10 wherein said stationary member comprises an axle, said rotatable member comprising a rim rotatably mounted on said axle, said stationary member including a plate assembly comprising an inner back-up plate and an outer power plate, said rotor and stator assemblies being disposed between said plates, said power means comprising fluid actuated piston means mounted on said power plate and adapted for engagement with said stator assembly to shift the latter axially into frictional coaction with said rotor assembly.

13. A brake in accordance with claim 12 wherein said rim has a portion encompassing said rotor and stator assemblies, and said means coacting with each lug comprising a plurality of circumferentially spaced coplanar sockets on said rim portion each receiving in pivotal relation the respective lug on said segments for pivotally mounting the respective segment to the rim, each of said sockets being open on one lateral end thereof for axial assembly of the segments to the rim.

References Cited

UNITED STATES PATENTS

| | | | |
|---|---|---|---|
| 854,720 | 5/1907 | Dawson | 188—72 |
| 2,423,882 | 7/1947 | Frank. | |
| 2,683,504 | 7/1954 | Martin. | |
| 2,753,032 | 7/1956 | Eason. | |
| 3,371,749 | 3/1968 | Lucien et al. | |

FOREIGN PATENTS 35,500  2/1954  Poland.

GEORGE E. A. HALVOSA, Primary Examiner

U.S. Cl. X.R.

188—218; 192—107